(12) United States Patent
Holcomb et al.

(10) Patent No.: US 8,320,039 B2
(45) Date of Patent: Nov. 27, 2012

(54) CLADDING-PUMPED OPTICAL AMPLIFIER HAVING REDUCED SUSCEPTIBILITY TO SPURIOUS LASING

(75) Inventors: Douglas P. Holcomb, Morris Plains, NJ (US); Thomas Huntington Wood, Holmdel, NJ (US); Paul Wysocki, Blacksburg, VA (US)

(73) Assignee: LGS Innovations LLC, Florham Park, NJ (US)

( * ) Notice: Subject to any disclaimer, the term of this patent is extended or adjusted under 35 U.S.C. 154(b) by 396 days.

(21) Appl. No.: 12/761,538

(22) Filed: Apr. 16, 2010

(65) Prior Publication Data
US 2011/0255153 A1 Oct. 20, 2011

(51) Int. Cl.
H01S 3/07 (2006.01)
H01S 3/063 (2006.01)
H04B 10/12 (2006.01)

(52) U.S. Cl. ............... 359/337.2; 359/341.1; 359/341.3
(58) Field of Classification Search ............... 359/337.2, 359/341.1, 341.3
See application file for complete search history.

(56) References Cited

U.S. PATENT DOCUMENTS

| | | | |
|---|---|---|---|
| 6,324,326 B1 * | 11/2001 | Dejneka et al. ............... 385/123 |
| 6,583,925 B1 * | 6/2003 | Delavaux et al. ......... 359/341.32 |
| 6,611,372 B1 * | 8/2003 | Peyghambarian et al. 359/341.1 |
| 7,526,165 B2 * | 4/2009 | Nielsen et al. ............... 385/125 |
| 7,848,014 B2 * | 12/2010 | Sweeney et al. ........... 359/337.3 |
| 2007/0216995 A1 * | 9/2007 | Bollond et al. .......... 359/341.32 |
| 2008/0219299 A1 * | 9/2008 | Lewis .............................. 372/6 |
| 2009/0257116 A1 * | 10/2009 | Sweeney et al. ........... 359/341.3 |

OTHER PUBLICATIONS

Yusim et al. "100 Watt, single-mode, CW, linearly polarized all-fiber format 1.56um laser with suppression of parasitic lasing effects", Proceedings of SPIE, vol. 5709, pp. 69-77 , (2005).*

Kazuo Shiraishi et al—Spotsize Contraction in Standard Single-Mode Fibers by Use of GI_Fiber Tip with Hihg Focuring Parameter—IEEE Photonics Technology Letters, vol. 10 No. 12, Dec. 1998—3 pages.
P. Wysocki et al—High Reliability 49 dB Gain, 13W PM Fiber Amplifier at 1550 nm with 30 dB PER and Record Efficiency—2006 OSA/OFC 2006—3 pages.
Michael N. Zervas et al—Efficient Erbium-Doped Fiber Amplifiers Incorporating an Optical Isolator—IEEE Journal of Quantum Electronics, vol. 31 No. 3—Mar. 1995—9 pages.
X. Zhu et al—Detailed Investigation of self-imaging in large-core multimode optical fibers for application in fiber lasers and amplifiers—Oct. 13, 2008/vol. 16, No. 21/Optics Express 16632—14 pages.
Lucas B. Soldano et al—Optical Multi-Mode Interference Devices Based on Self-Imaging: Principles and Applications—Journal of Lightwave Technology, vol. 13 No. 4, Apr. 1995—13 pages.

* cited by examiner

*Primary Examiner* — Eric Bolda
(74) *Attorney, Agent, or Firm* — M. I. Finston (57) ABSTRACT

An optical amplifier comprises at least two gain regions, an intermediate region situated between the gain regions, and a transition region situated between the intermediate region and each gain region. The aforesaid regions have claddings that collectively form a path for pump radiation propagating from at least one of the gain regions to the other gain region, and cores that collectively form a path for signal radiation propagating from at least one of the gain regions to the other gain region. The cores in the gain regions support multiple propagating optical modes, including at least one signal mode and at least one non-signal mode. The intermediate region, however, supports fewer propagating core modes than are supported by the gain regions. The transition regions are conformed such that when radiation in propagating non-signal core modes passes from the gain regions into the intermediate region, it is at least partly coupled into cladding modes of the intermediate region.

24 Claims, 6 Drawing Sheets

CLADDING-PUMPED OPTICAL AMPLIFIER HAVING REDUCED SUSCEPTIBILITY TO SPURIOUS LASING

ACKNOWLEDGEMENT OF GOVERNMENT SUPPORT

This invention was made with Government support. The Government has certain rights in this invention.

FIELD OF THE INVENTION

The invention relates to cladding-pumped optical amplifiers, and more particularly to high-power optical fiber amplifiers and high-power optical amplifiers implemented in planar waveguide geometry.

ART BACKGROUND

Figure 1:
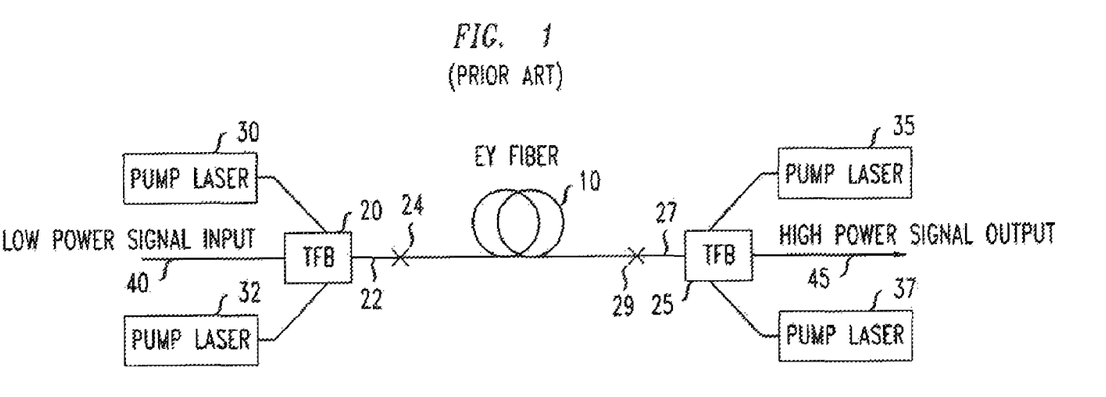
FIG. 1 is a schematic diagram of a cladding-pumped optical amplifier of the prior art. None of the schematic diagrams provided here are drawn to scale.

A typical configuration for a conventional high-power optical amplifier is shown in FIG. 1. By way of illustration, amplifier fiber 10 may be a cladding-pumped multimode or slightly multimoded fiber co-doped with erbium and ytterbium (an "EY fiber") for pumping in the band near 940 nm and for producing optical gain in the 1550-nm band. In the configuration shown, tapered fiber bundle (TFB) 20 couples pump light from pump lasers 30 and 32 into fiber 10, and TFB 25 likewise couples pump light from pump lasers 35 and 37 into fiber 10. Each TFB has a typically undoped, single-mode center fiber (22 and 27, respectively) coupled to fiber 10 by a respective splice 24, 29. As seen in the figure, a low-power input optical signal on fiber 40 enters the amplifier from the left, and an amplified high-power output signal exits the amplifier on fiber 45 at the right. It should be noted that although, for simplicity, the figure shows only two pump lasers connected to each TFB, it is more typical to use a greater number, such as six pump lasers per TFB.

In operation of the amplifier of FIG. 1, low-power signal 40 combines with pump light as it passes through TFB 20, undergoes amplification in fiber 10, passes through TFB 25, and exits as high-power signal 45. Fiber 10 typically has a core that is 10 microns in diameter and a cladding that is 125 microns in diameter. The signal light is typically guided in one or more core modes of fiber 10, whereas the pump light is typically guided in one or more cladding modes. A low-index outer cladding, commonly of a polymeric material, is often used to help confine the pump light.

Optical amplifiers of the kind described above suffer from parasitic lasing. For example, EY fibers provide gain not only in the 1550-nm signal band, but also in the 1060-nm band. If 1060-nm light experiences sufficient gain in a pass through an optical cavity, and further experiences sufficient reflectivity at the ends of the optical cavity, undesired lasing may take place in the 1060-nm band. This lasing often takes place in higher-order modes of the EY fiber. Such lasing is undesirable, not least because in high-power operation, it can damage optical components.

In fact, parasitic lasing has been observed in high-power EY fiber amplifiers. The conditions for parasitic lasing may be due, for example, to high values of the optical gain per unit length, and relatively high reflectivity at interfaces such as the exit windows of the pump lasers. Consequently, the need to avoid such parasitic lasing may limit the operating power levels of optical amplifiers. Greater power levels could be achieved, in at least some cases, if such parasitic lasing could be suppressed.

SUMMARY OF THE INVENTION

We have developed an optical amplifier in which parasitic lasing is suppressed. In a broad aspect, our amplifier comprises at least two gain regions, an intermediate region situated between the gain regions, and transition regions situated between the intermediate region and each gain region. The aforesaid regions have claddings that collectively form a path for pump radiation propagating from at least one of the gain regions to the other gain region, and cores that collectively form a path for signal radiation propagating from at least one of the gain regions to the other gain region.

At least at some of the wavelengths that are present during operation of the amplifier, the cores in the gain regions support multiple propagating optical modes, including at least one signal mode and at least one non-signal mode. The intermediate region, however, supports fewer propagating core modes than are supported by the gain regions. The transition regions are conformed such that when radiation in propagating non-signal core modes passes from the gain regions into the intermediate region, it is at least partly coupled into the cladding of the intermediate region.

In some embodiments, the cladding-formed pump radiation path is optically continuous.

In some embodiments, the core-formed signal radiation path is spectrally transparent.

In some embodiments, the cladding-formed pump radiation path is optically continuous, and the core-formed signal radiation path is spectrally transparent.

In some embodiments, the gain regions comprise segments of multimode fiber, and the intermediate region comprises a segment of single-mode fiber.

In some embodiments, the intermediate region comprises the waist of a tapered fiber segment, and at least an outer cladding zone in the intermediate region has a refractive index that is reduced relative to the cladding in the gain regions by an amount selected to at least partially confine pump radiation propagating in the intermediate zone.

In some embodiments, the gain regions, the transition regions, and the intermediate region are implemented in a planar waveguide geometry, and the core of the intermediate region comprises the waist of a tapered core structure.

In some embodiments, the gain regions, the transition regions, and the intermediate region are implemented in a planar waveguide geometry, the core of the intermediate region comprises the waist of a tapered core structure, and the core of the intermediate region is laterally displaced from the core of the gain regions in such a way as to bring it into a zone having an effective cladding refractive index that is reduced relative to the gain regions.

In some embodiments, conformed for side-pumping of the gain medium, a pump waveguide conformed to guide the pump radiation contacts the path collectively formed by the claddings at least at one point, and the pump waveguide is further conformed to couple pump radiation into the collectively formed path.

DETAILED DESCRIPTION

Our ideas for an improved optical amplifier may be applied both in devices implemented using optical fiber technology and in devices implemented using planar waveguide technology. Below, we provide an example embodiment implemented with optical fibers, followed by further examples implemented in planar waveguides. All of the below examples are meant to be illustrative and not limiting. In particular, the choice of an EY fiber for providing optical gain is purely for purposes of illustration and is not meant to be limiting as to the gain medium.

An optical fiber will generally support one or more transverse optical modes, each having a particular pattern of intensity versus position across the face of the fiber. Each mode also has a particular effective refractive index, which determines the longitudinal propagation constant for a given wavelength of light. (Polarization also needs to be taken into account to give a complete description of modal behavior. However, the principles of the present invention are usefully employed both in fibers that do, and in fibers that do not, discriminate based on polarization. Therefore, for clarity, we will focus on exemplary embodiments in which polarization may be disregarded. Those skilled in the art will readily understand how to generalize our description to fibers whose optical behavior is sensitive to polarization.)

Single-mode fibers support only one transverse mode in the core at the wavelength of interest. With further reference to the amplifier configuration of FIG. 1, input and output signal fibers 40 and 45 and TFB center fibers 22 and 27 will typically be single-mode fibers.

It should be noted in this regard that whenever an optical fiber or optical waveguide is referred to as "single-mode" or "multi-mode", these terms are meant to describe the behavior of the fiber or waveguide solely at the wavelengths of interest, and not across the entire optical spectrum. It should be noted further that the use of a TFB for injection of signal and pump light is described purely for illustrative purposes. As those skilled in the art will understand, various other optical elements are useful for similar purposes, including, for example, single-mode/multimode combiners of various kinds.

The EY fibers in the gain stages of high-power optical amplifiers, such as fiber 10 of the figure, however, are typically not single-mode fibers. Instead, they typically support as many as ten or more transverse modes, including a fundamental mode and higher-order modes. In general, splices such as splices 24 and 29 as shown in the figure are conformed to couple light efficiently from the single-mode fibers into the fundamental mode of the EY fiber, and from the fundamental mode of the EY fiber into the single-mode fibers. Moreover, if the splices are well-formed, the higher-order modes of the EY fiber will couple almost exclusively to cladding modes of the TFB fibers.

It is important to note in this regard that gain may be experienced by radiation not only in the fundamental mode of the EY fiber, but also in the higher-order modes. As a consequence, the higher-order modes of the EY fiber may contribute to lasing.

More specifically, each mode of the EY fiber has a respective value of the optical gain α per unit length, the reflectivity $R_1$ at the left end (as seen in the figure) of the cavity, and the reflectivity $R_2$ at the right end of the cavity. Accordingly, each mode has a respective value of the round-trip gain $G_{rt}$, given by the expression $G_{rt}=R_1R_2e^{2\alpha L}$, where L is the length of the EY fiber. If for any mode the round-trip gain is at least 1, the amplifier will lase, resulting in possible damage.

We have observed in high-power amplifiers of our experience, that the lowest pumping threshold for lasing tends to be associated with a higher-order mode, and not with the fundamental mode, of the EY fiber. We believe this is largely because the reflectivities seen by the higher-order modes are greater than the reflectivities seen by the fundamental mode. These reflectivities are greater, in turn, because, as described above, the higher order EY fiber modes are well coupled into cladding modes of the TFB fiber. These cladding modes are efficiently coupled into the pump laser pigtails by the TFB, and then into the pumps, where they may be reflected with relatively high efficiency. (By contrast, radiation in the fundamental core mode of the EY fiber can generally be guided out of the fiber without encountering high reflectivity.)

As a consequence, there may be, at 1060 or 1550 nm, at least one higher-order mode of the EY fiber for which both the optical gain and the end reflectivities are high enough to support lasing, unless operating power is limited.

Figure 2:
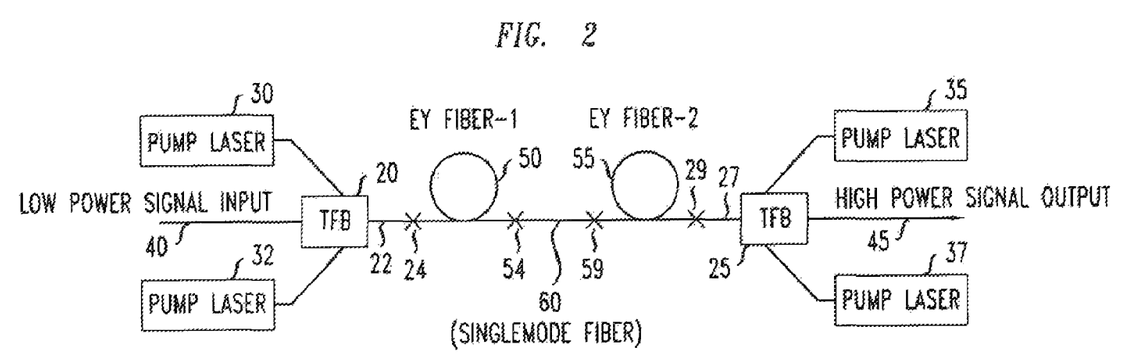
FIG. 2 is a schematic diagram of an improved cladding-pumped optical amplifier according to an embodiment of the present invention.

Turning now to FIG. 2, shown there is an example embodiment of our invention. Figure elements that are common to FIGS. 1 and 2 are identified by similar reference numerals. A comparison of FIGS. 1 and 2 will show that in FIG. 2, EY fiber 10 has been divided into two fiber sections 50 and 55, separated by single-mode fiber 60. As in FIG. 1, reference numerals 24 and 29 identify splices between TFB center fibers and respective ends of an EY fiber. However, FIG. 2 adds splice 54 between the left (as seen in the figure) EY fiber 50 and fiber 60, and adds splice 59 between the right EY fiber 55 and fiber 60.

More generally, fibers 50 and 55 constitute an example of two gain regions, fiber 60 constitutes an example of an intermediate region situated between the gain regions, and splices 54 and 59 constitute examples of transition regions situated between the intermediate region and the respective gain regions. As will be explained in greater detail below, fibers 50, 55, and 60 and splices 54 and 59 have claddings that collectively form a path for pump radiation propagating from at least one of the gain regions to the other gain region, and further have cores that collectively form a path for signal radiation propagating from at least one of the gain regions to the other gain region. Other example embodiments that also include gain regions, an intermediate region, and transition regions will be described later.

With further reference to FIG. 2, each of fibers 50 and 55 may, for example, be made half the length of fiber 10 of FIG. 1, in order to provide an amplifier performing similarly to the amplifier of FIG. 1. Fiber 60 is advantageously chosen to be a length $L_{SM}$ of single-mode fiber that is double-clad, i.e., having a low-index outer cladding in addition to its inner glass cladding region.

Splices 24, 29, 54, and 59, which are preferably optimized splices, are used to connect single-mode fibers 22, 60, and 27 to respective multimode EY fibers 50 and 55.

An example of how the amplifier of FIG. 2 may operate will now be discussed with reference to FIG. 3. Certain elements of FIG. 2 are shown in expanded form in FIG. 3. Those elements that are common to both figures are identified using similar reference numerals.

Figure 3:
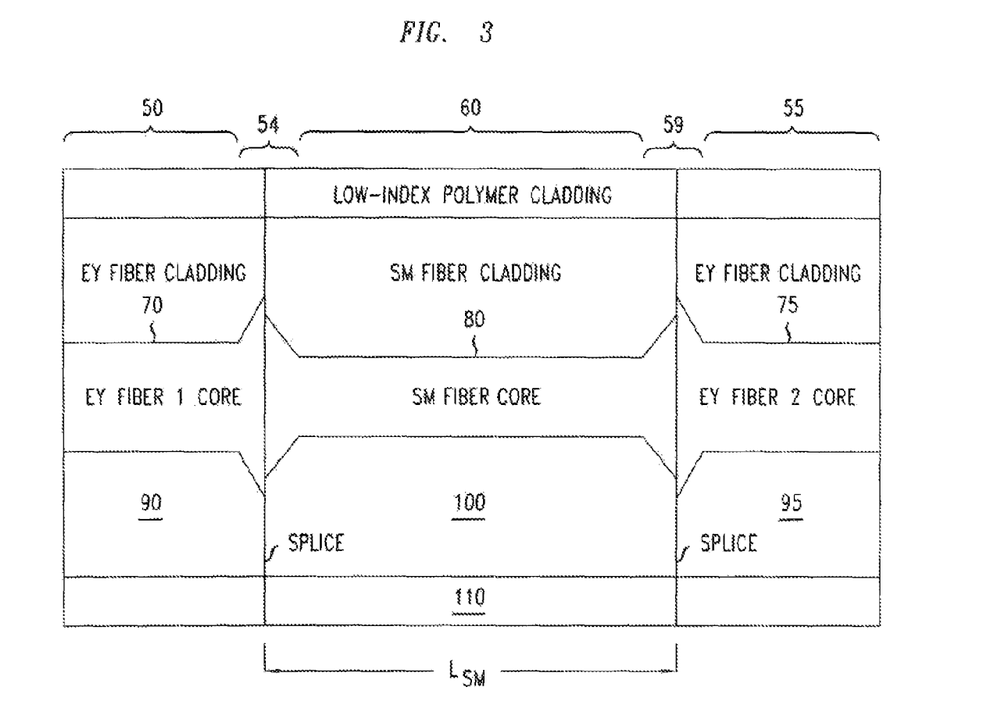
FIG. 3 is an expanded view of a detail of FIG. 2.

Turning now to FIG. 3, it will be seen that fibers 50 and 55 have respective cores 70, 75 and respective claddings 90, 95. It will be seen further that fiber 60 has a core 80. As this is a single-mode core, it is shown as smaller in diameter than the multimode cores of fibers 50 and 55. It will be seen further that fiber 60 has a cladding 100, which is typically glass, and an outer, low-index cladding 110, which is typically polymer. (In some cases, the polymer layer may be omitted and an effective outer cladding may then be provided by the surrounding air.) The adjacent fibers, such as fibers 50 and 55, will typically also have inner glass claddings and outer low-index claddings. The length of intermediate, single-mode fiber 60 is indicated in the figure as $L_{SM}$.

With further reference to FIG. 3, it will be assumed in the following discussion that light is traveling from left to right, as seen in the figure. This assumption is made for convenience only, and no loss of generality is intended. Those skilled in the art will appreciate that the effects to be discussed apply equally to propagation from right to left, and that for lasing to take place, there must be propagation in both directions.

Signal light that has been coupled into the fundamental mode of EY fiber 50 at a wavelength of 1550 nm is amplified in EY fiber 50. Propagating to the right, as seen in the figure, the amplified light is coupled, at splice 54, into the guided mode of single-mode fiber 60. The coupling efficiency may approach 100% if the splice has been optimized. To the right of splice 54, the coupled light propagates efficiently to splice 59, where the light is coupled (again, possibly with efficiency approaching 100%) to the fundamental mode of EY fiber 55. Thus, the respective cores collectively define a path for signal radiation propagating from at least one of the gain regions to the other gain region.

The coupled fundamental-mode light is amplified in EY fiber 55, and after traversing fiber 55 it exits the amplification stage.

Meanwhile, pump light that is copropagating with the signal light from left to right in the cladding of EY fiber 50 is coupled efficiently into cladding 100 of single-mode fiber 60, and from there into the cladding of EY fiber 55, without significant attenuation. Counterpropagating pump light in EY fiber 55 is likewise coupled efficiently across single-mode fiber 60 into EY fiber 50.

Thus, the respective claddings collectively define a path for pump radiation propagating from at least one of the gain regions to the other gain region. The path is advantageously made optically continuous. By this, we mean that with respect to the pump light, there is no more than 3 dB of optical attenuation in the combined transition and intermediate regions.

As noted above, a path for signal radiation is collectively defined by the respective cores. It is also advantageous to make this signal radiation path spectrally transparent. By this, we mean that there are no wavelength-selective elements that have a significant selective effect on radiation of any wavelength that lies within a gain band of the amplifier. Some embodiments of the invention may provide an optically continuous path as described above, some may provide a spectrally transparent path as described above, and some further embodiments may provide paths of both kinds.

As noted above, the coupling of signal and pump light between the EY fibers and the single-mode fiber can be made very efficient. However, imperfections in the splices are expected to cause some optical loss. As a consequence, introducing the single-mode fiber as an intermediate fiber between the EY fiber sections is expected to result in some attenuation of the signal and pump light, leading to a reduction in the overall gain and efficiency of the amplifier of FIG. 2, relative to the amplifier of FIG. 1. Because splice loss is expected to be small, however, this reduction in gain and efficiency is also expected to be relatively small. In at least some cases, it may be desirable to compensate this effect by increasing the total length of EY fiber in the amplifier of FIG. 2, relative to the amplifier of FIG. 1.

As noted above, signal radiation tends to be efficiently coupled from single-mode center fibers of the TFBs, such as fibers 22 and 27 of FIGS. 1 and 2, into the fundamental mode of the EY fibers. On the other hand, the higher-order (i.e., non-fundamental) modes propagating in, e.g., EY fiber 50 (which, it will be recalled, is in this example a multimode fiber) will not necessarily experience high coupling efficiencies to EY fiber core 75 while traversing the structure of FIG. 3. That is, when the higher-order modes are coupled out of the core of EY fiber 50 into single-mode fiber 60, they are expected to couple preferentially into cladding modes. That is, the light is expected to couple substantially more efficiently into cladding modes of single-mode fiber 60 than into the guided core mode of fiber 60, especially if the splice has been optimized for high coupling efficiency between the fundamental modes. It is important to note in this regard that the amplifier is most likely to lase in higher-order modes because, as described above, these higher-order modes see greater reflectivity from the ends of the amplifier than the fundamental mode.

It should be noted that although we are referring here to cladding modes in which the coupled light is guided within the cladding, a portion of the coupled light might couple into radiative modes that escape the fiber altogether. Indeed, such readiative coupling might be dominant in some embodiments.

The light that has been launched into the (guided) cladding modes of fiber 60 traverses the fiber from, e.g., left to right. At splice 59, however, only a small fraction of this light is expected to couple into the core of EY fiber 55. Most is expected to remain in cladding modes when it couples into fiber 55. Analogous behavior is expected for light in higher-order modes of EY fiber 55 that couples into fiber 60 and traverses it from right to left.

In the following discussion, we will refer to the higher-order core modes of the EY fibers as "non-signal" modes, and we will refer to light originating in such modes as "non-signal mode light." (By "originating" is meant that the light was in a non-signal mode of an EY fiber before being coupled into a subsequent fiber.) To avoid confusion, we note here that pump light is not included in our definition of non-signal mode light.

Turning again to FIG. 3, it will be understood that the non-signal mode light propagating to the right from EY fiber 50 will experience substantial gain only from half of the total amplification stage. That is, the non-signal mode light is confined substantially to cladding modes in its traversal of EY fiber 55, whereas amplification takes place substantially in the fiber core. Therefore, the non-signal mode light will experience relatively little gain, possibly a negligible amount of gain, over the length of EY fiber 55.

Although the non-signal mode light will see substantially the same reflectivities $R_1$ and $R_2$ that were discussed above with reference to FIG. 1, the reduction in overall gain may make it possible to increase the pump power above conventional levels without fear of unwanted lasing.

More specifically, halving the effective length over which gain takes place will roughly halve the overall gain, expressed in decibels, at 1060 nm (or in other wavelengths of non-signal-mode light). We estimate that when the amplifier configuration of FIG. 1 is operated at the lasing threshold, the gain at 1060 nm may be about 30 dB, a value that will depend on the properties of the single-mode/multimode combiner such as the TFB. The corresponding gain in the configuration of FIG. 2, when operated at the same pumping level, would only be about 15 dB, thus realizing an improvement of 15 dB. It should be noted, however, that this is a rough estimate that neglects, for example, the possible need to increase the pump power to compensate the splice losses, as well as the possibility of some residual coupling of non-signal-mode light from one EY fiber into the core of the single-mode fiber, and from there into the core of the other EY fiber.

Two more effects may somewhat reduce the beneficial effect described above. In a process we refer to as "core-core-core coupling", the guided core mode of the single-mode fiber couples to higher-order core modes of both EY fibers. Each individual coupling efficiency may be, e.g., about 10%, leading to a joint efficiency of, e.g., about 1%, i.e., about −20 dB. Thus, it will be understood that because this is a second-order effect, it will generally be small.

A second process that we refer to as "core-cladding-core coupling" may likewise somewhat reduce the beneficial effect described above. In this second process, light propagating, e.g.; rightward from fiber 50 as seen in FIG. 3, is efficiently launched into cladding modes of fiber 60. At splice 59, some of that light is coupled into higher-order core modes of fiber 55. However, this effect is expected to be small, because the non-signal mode light in fiber 60 will be distributed among many cladding modes, only a relatively small number of which are likely to couple efficiently to core modes of fiber 55.

This process can be further understood by recognizing that, for light propagating in the cladding of fiber 60, the fiber 60 can be thought of as a multi mode interference (MMI) coupler, with the cladding forming the MMI coupler's waveguide. These couplers are described in a paper by L. Soldano and E. Pennings, "Optical Multi-Mode Interference Devices Based on Self-Imaging: Principles and Applications," *Journal of Lightwave Technology*, Volume 13, Number 4, pages 615-627 (April 1995). These authors show, for example in FIG. 3 of the above paper, that the input mode is periodically re-imaged along the length of the MMI coupler. Thus, higher-order mode light launched into the cladding of fiber 60 at splice 54 will be reimaged back to its original mode pattern at very specific distances along the length of fiber 60. If the length $L_{SM}$ of single-mode fiber 60 were to coincide with one of these distances, core-cladding-core coupling could be quite efficient. This would undesirably limit the beneficial effect described above. However, the above said authors also show that at other distances, the input mode is transformed into modified images with very low overlap with the original pattern. If $L_{SM}$ were instead to coincide with one of these distances, core-cladding-core coupling could be quite inefficient, and thus the aforesaid beneficial effects would not be as limited.

Accordingly, for maximum effectiveness, it may be advantageous to select a length for single-mode fiber 60 that corresponds to a distance over which (according to the Soldano-Pennings analysis) the input mode pattern is reimaged into a new pattern having little overlap with the original mode pattern.

A further study of MMI couplers, in the context of large core optical fibers, has been reported by X. Zhu et al. in "Detailed investigation of self-imaging in large-core multimode optical fibers for application in fiber lasers and amplifiers," *Optics Express*, Volume 16, Number 21, pages 16632-16645 (2 Oct. 2008). In this reference, Zhu studies coupling from the core of a standard single-mode fiber into the core of a multimode fiber and back into a mode matching the core of a standard single-mode fiber. He calculates that, for a multimode core diameter of 50 microns, approximately 90% recoupling can be achieved for very specific values of $L_{SM}$. However, this recoupling is very sensitive to the precise value of $L_{SM}$. The precision required to achieve recoupling increases as the core diameter increases.

In the arrangement that we describe here, recoupling might be disadvantageous because it could increase the gain seen by the higher-order mode light in fibers 50 and 55. However, our arrangement can, and typically would, use a single-mode fiber of about 125-microns diameter. Such a fiber diameter is larger than the case considered by Zhu. Therefore, we would expect the conditions necessary to achieve appreciable (undesirable) recoupling to be even more stringent than those identified by Zhu. Thus, Zhu et al. suggest that for most values of $L_{SM}$ the core-cladding-core coupling will be quite small.

It is also important to note that the studies by Soldano and Leanings and Zhu et al. neglect the effect of imperfections and irregularities along the length of the fiber 60. In practice, the interface between the cladding and the low-index polymer will have some imperfections, such as surface roughness. In addition, irregularities could be introduced deliberately by, for example, bending fiber 60 in a regular or irregular manner, making the fiber cladding star shaped, having small spiral grooves along its length, or having the cladding diameter vary slightly along its length. These imperfections and irregularities will have the effect of reducing the core-cladding-core coupling, especially for appreciable values of $L_{SM}$.

From a broader perspective, as noted above, single-mode fibers of dimensions that would typically be used for fiber 60 generally support a large number of cladding modes. For example, we have estimated that a single-mode fiber 125 microns in diameter with a numerical aperture of 0.45 will support 14,000 cladding modes at a wavelength of 1060 nm. We believe that by making the length $L_{SM}$ of single-mode fiber 60 great enough, the optical power in the cladding of fiber 60 can be well mixed among the many cladding modes as a result of inevitable fiber imperfections. This will make it extremely improbable that any cladding mode will, in combination, experience substantial excitation from core modes of fiber 50, transport the resulting coupled light efficiently to fiber 55, and recouple the same light into the core of fiber 55. We estimate that an $L_{SM}$ of several meters would suffice for this purpose. The minimum length that would suffice could readily be ascertained through routine experimentation.

Figure 4:
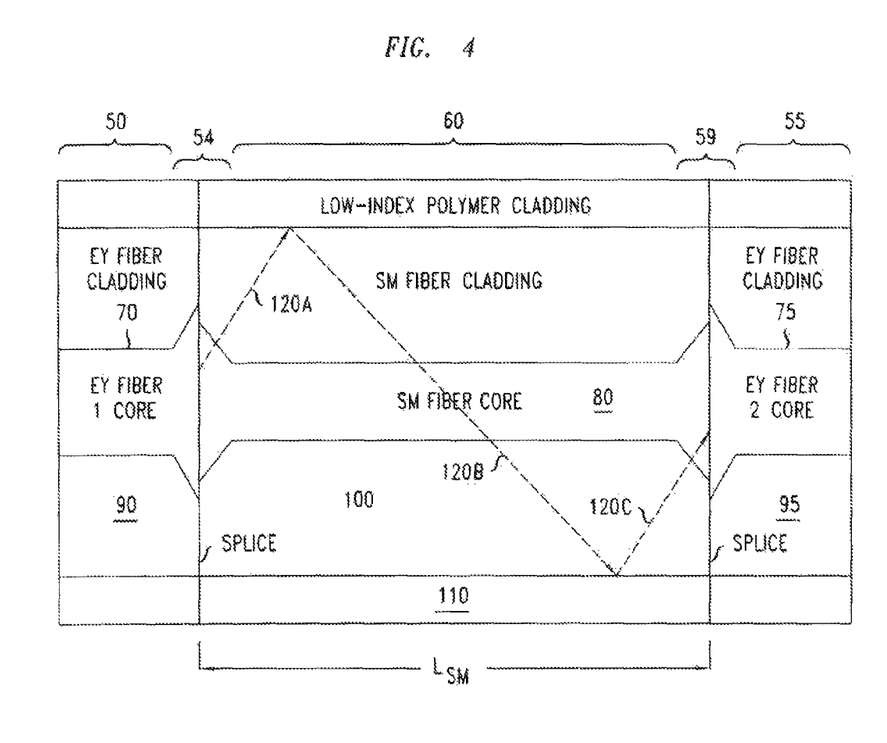
FIG. 4 is a version of FIG. 3, in which certain dimensions have been altered and a propagating light ray has been added.

An alternative approach for suppressing core-cladding-core coupling relies on making $L_{SM}$ very short, for example in the range from 10 to about 125 microns. The reason why we believe this may be a useful approach is best understood with reference to FIG. 4. Features common to FIGS. 3 and 4 are identified with similar reference numerals. Added to FIG. 4 is trajectory 120, comprising segments 120A-120C, which represents, from the viewpoint of geometrical optics, a ray of light emanating from the vicinity of splice 54 and propagating generally to the right, via multiple reflections from the interface between the inner and outer claddings of fiber 60. Two such reflections are shown in the figure. When the ray of light reaches splice 59, it may be coupled into the core of fiber 55.

Reference to FIG. 4 will show that, at least for trajectory 120, there will be some range of distances from splice 54, as measured along the fiber axis, where the ray is relatively far from the fiber cure, and thus little or no optical power is overlapping the core. The range of distances to which we refer corresponds to portions of segments 120A and 120B. The range extends from a region a few tens of microns from splice 54, to a distance of about the fiber diameter (which in this example is 125 microns). We believe that if $L_{SM}$ is chosen to lie within the stated range, a substantial fraction of the light launched from fiber 50 into cladding modes of fiber 60 will fail to recouple into core modes of fiber 55.

The above "ray tracing" argument can be complemented by the more detailed analysis in the MMI paper by Soldano and Pennings, cited above. For example, in their FIG. 3, it is shown that at periodic values of $L_{SM}$ ($3L_\pi/2$, $9L_\pi/2$, etc.), the input field is reimaged into a pattern with essentially no power at the original location. These values of $L_{SM}$ would be particularly advantageous for the operation of the arrangement that we have described.

In summary, we believe that the general predictions made by the above analysis are correct, and that they support our belief that a certain values of a short $L_{SM}$, as described, would be effective. It should be noted in this regard that although specialized techniques are required for splicing such short lengths of fiber, such techniques are known and available for use. One published work, illustrative of such known techniques, is K. Shiraishi et al., "Spotsize Contraction in Standard Single-Mode Fibers by Use of a GI-Fiber Tip with a High Focusing Parameter," *IEEE Photonics Technology Letters*, Vol. 10, No. 12, pages 1757-1759 (December 1998).

Figure 5:
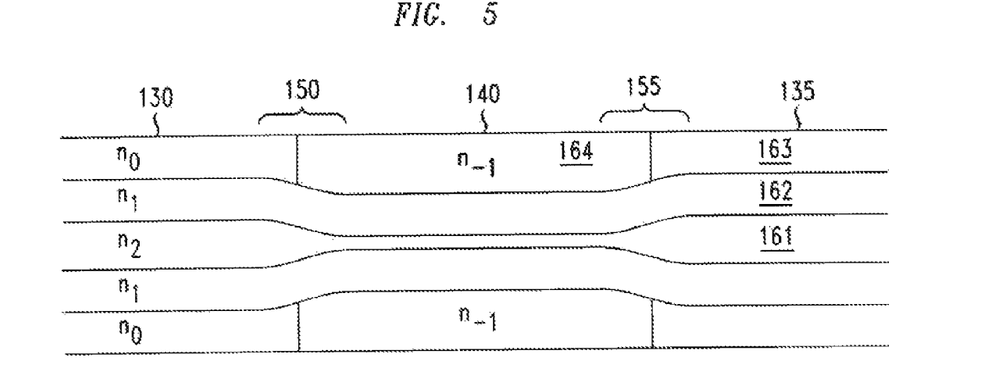
FIGS. 5-8 are schematic diagrams of portion of an optical amplifier, illustrating the invention in various exemplary embodiments.

FIG. 5 illustrates an alternate embodiment in which the amplifier configuration includes multimode gain segments of optical fiber 130, 135 which may, e.g., be EY fiber, and a single-mode fiber segment 140. The arrangement of FIG. 5 is formed by tapering an initial, generally multimode, section of fiber. Accordingly, transition regions 150, 155 are taper regions rather than splice regions.

As seen in the figure, the multimode and single-mode regions have glass cores 161 of refractive index $n_2$ and inner claddings 162 of refractive index $n_1$. It will also be seen that there is an outer cladding 163 having index $n_0$ in the multimode regions, and an outer cladding 164 having index $n_1$ in the single-mode region. The outer cladding may be composed of glass or polymer, or in some cases the surrounding air might serve as the effective outer cladding.

The respective refractive indices are selected so that fiber segments 130 and 135 will function as multimode fibers and fiber segment 140 will function as a single-mode fiber with respect to the wavelengths of interest, and further so that the inner cladding of fiber segment 140 has a sufficient numerical aperture to contain and guide the pump light from/to the inner cladding regions of segments 130 and 135.

Figure 6:
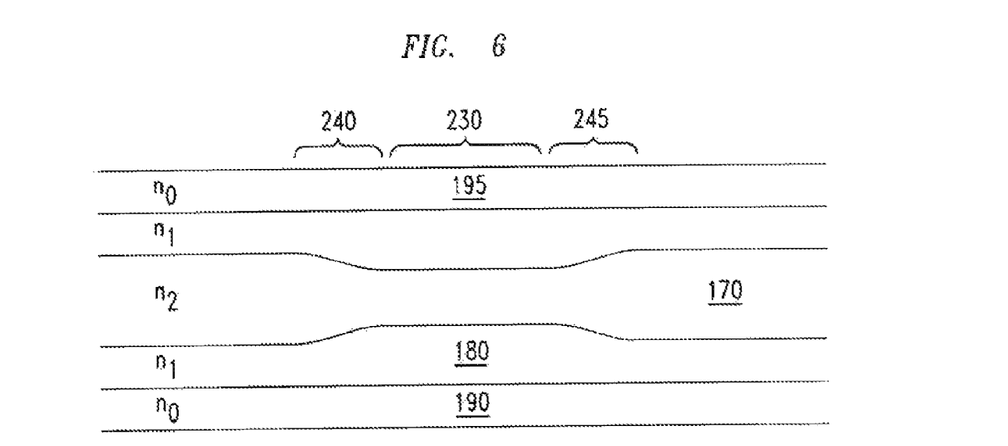
Figure 7:
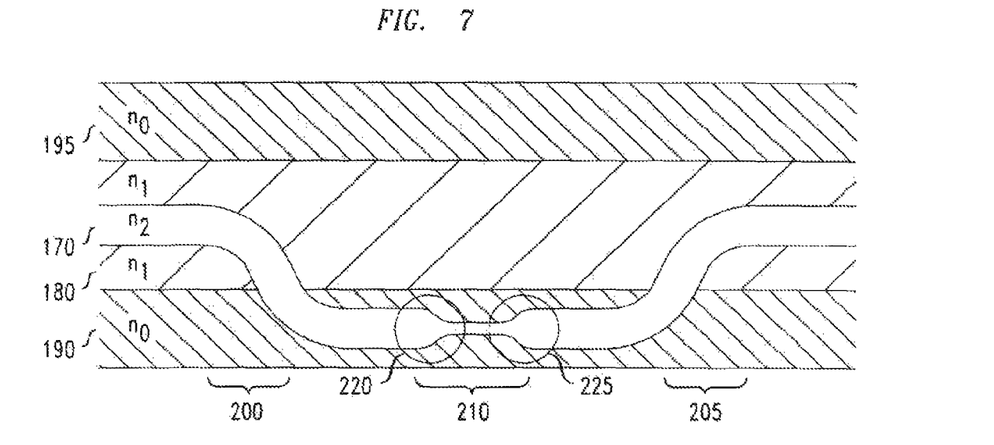

FIG. 6 illustrates another alternate embodiment implemented in a planar waveguide geometry. Features common to FIGS. 6 and 7 are identified by similar reference numerals. FIGS. 6 and 7 are cross-sectional views of the waveguiding apparatus, in which the section is taken along a plane parallel to the substrate and passing through the center of the waveguide core regions. The view is from above, looking in a direction perpendicular to the substrate. The core regions as shown in the figures are appropriately bounded on their respective faces distal and proximal the substrate for confining and guiding light.

As seen in FIG. 6, single-mode operation of waveguide section 230 is achieved by tapering section 230, which is separated from the multimode regions by taper regions 240 and 245. The planar waveguide geometry affords the configuration flexibility, unlike the fiber example shown in FIG. 5, to taper the core in section 230 without the need to reduce the size of the inner cladding.

FIG. 7 illustrates an alternate embodiment that is implemented in a planar waveguide geometry. Out of the plane, all light is appropriately guided. As seen in the figure (which as noted depicts the configuration in the plane of the waveguide core regions), the waveguide has a core 170 of refractive index $n_2$, an inner cladding 180 of index $n_1$, and lower (in the figure view) and upper (in the figure view) claddings 190, 195 of index $n_0$. (The use of similar symbols to represent refractive indices is not meant to suggest that the values taken by these indices in any one illustrated embodiment bear any relationship to the values taken in any other illustrated embodiment.) The waveguide is conformed to be multimode, except in region 210 where it is single-mode. Tapers 220 and 225 are the transitions between the multimode and single-mode regions.

In designing planar waveguide devices, it may sometimes be desirable to laterally shift the signal waveguide so that for part of its length, it lies outside the pump waveguide. Such a design is illustrated in FIG. 7. Thus, for example, core 170 includes
serpentine sections 200, 205, which shift the core out of direct contact with cladding 180 and bring both sides of the core directly adjacent to cladding 190. The shifted portion of core 170 provides a convenient location for the mode-stripping region 210, including tapers 220 and 225, as shown in the figure.

Figure 8:
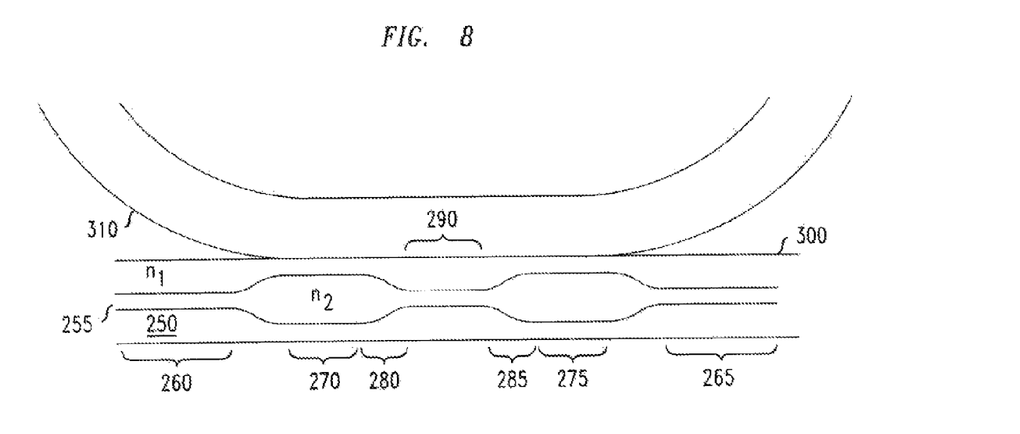

FIG. 8 illustrates another alternate embodiment. As described, this embodiment is implemented in optical fiber technology, although similar designs can also be implemented in planar waveguide technology.

The embodiment shown in FIG. 8 includes an inner cladding 250 of refractive index $n_1$ and a core 255 of refractive index $n_2$. (Internal structure of cladding 250, as well as further claddings that could be included, have been omitted from the figure for clarity.) The embodiment includes single-mode waveguiding portions 260 and 265 for input and output of signal light. Also included are multimode gain regions 270 and 275, transition regions 280 and 285, and single-mode intermediate waveguiding section 290, all of which may be implemented according to the various examples described above. Collectively, the elements listed above are comprised by waveguide 300.

Whereas the pump radiation in some other embodiments enters cladding 250 as a result of end-injection, the amplifier arrangement of FIG. 8 is a side-pumped arrangement. That is, pump light is directed toward waveguide 300 by pump waveguide 310. There is sufficient contact between waveguide 300 and the pump waveguide for pump light to transfer into cladding 250. Such contact may be at a single point of tangency, or it may be maintained over an extended distance, as shown in the figure. The contact region may be terminated (that is, the fibers may be separated) over all or a portion of the intermediate waveguiding region 290, for the purpose of, for example, ease of fabrication. The inner cladding 250 may also be tapered over the intermediate waveguiding region 290, for the purpose of, for example, ease of fabrication.

As in the other example embodiments that have been shown, the gain regions, the transition regions, and the intermediate region have claddings (i.e., the pertinent portions of cladding 250, including local structure and refractive index variations not shown in the figure) that collectively form an optically continuous path for pump radiation propagating from at least one of the gain regions to the other gain region.

As noted, the embodiments described above are merely exemplary, and are not meant to exclude other implementations that make use of the principles described here.

It should be noted in particular that the use of EY-doped glass as a gain medium is described purely for illustrative purposes, and that the same principles will apply to optical amplifiers using gain media of various other compositions. Similarly, the unwanted radiation in the 1060-nm band is only one example of non-signal radiation that appears in higher-order modes and is advantageously suppressed within the gain stage. In some cases, the principles described here will be advantageously applied to suppress, as troublesome, higher-mode radiation even if it is in the signal band itself. Thus, it will be understood that in its broadest aspect, the invention acts to inhibit radiation in certain modes, as opposed to radiation at certain wavelengths, from coupling into the core regions of the gain stage of an optical amplifier.

What is claimed is:

1. An optical amplifier comprising at least two gain regions, an intermediate region situated between the gain regions, and a transition region situated between the intermediate region and each gain region, wherein:
   (a) the gain regions, the transition regions, and the intermediate region have claddings that collectively form a path for pump radiation propagating from at least one of the gain regions to the other gain region;
   (b) the gain regions, the transition regions, and the intermediate region have cores that collectively form a path for signal radiation propagating from at least one of the gain regions to the other gain region;
   (c) the gain region cores support a plurality of propagating optical modes at least at some wavelengths present during operation of the amplifier, said propagating core modes including at least one signal mode and at least one non-signal mode;
   (d) the intermediate region supports fewer propagating core modes than the gain regions; and
   (e) the transition regions are conformed to couple at least some radiation out of propagating non-signal core modes of the gain regions, and into the cladding of the intermediate region; and
   (f) the cladding-formed pump radiation path is optically continuous.

2. The optical amplifier of claim 1, wherein the length of the intermediate region is chosen to minimize core-cladding-core coupling.

3. The optical amplifier of claim 1, wherein the intermediate region cladding has irregularities introduced along its length.

4. The optical amplifier of claim 1, wherein the gain regions comprise segments of multimode fiber, and the intermediate region comprises a segment of single-mode fiber.

5. The optical amplifier of claim 1, wherein the intermediate region comprises the waist of a tapered fiber segment.

6. The optical amplifier of claim 1, wherein at least an outer cladding zone in the intermediate region has a refractive index that is reduced relative to the cladding in the gain regions by an amount selected to at least partially confine pump radiation propagating in the intermediate zone.

7. The optical amplifier of claim 1, wherein the gain regions, the transition regions, and the intermediate region are implemented in a planar waveguide geometry, and the core of the intermediate region comprises the waist of a tapered core structure.

8. The optical amplifier of claim 1, further comprising a pump waveguide that contacts the path collectively formed by the claddings at least at one point, wherein said pump waveguide is conformed to guide pump radiation and to couple pump radiation into said collectively formed path.

9. An optical amplifier comprising at least two gain regions, an intermediate region situated between the gain regions, and a transition region situated between the intermediate region and each gain region, wherein:
   (a) the gain regions, the transition regions, and the intermediate region have claddings that collectively form a path for pump radiation propagating from at least one of the gain regions to the other gain region;
   (b) the gain regions, the transition regions, and the intermediate region have cores that collectively form a path for signal radiation propagating from at least one of the gain regions to the other gain region;
   (c) the gain region cores support a plurality of propagating optical modes at least at some wavelengths present during operation of the amplifier, said propagating core modes including at least one signal mode and at least one non-signal mode;
   (d) the intermediate region supports fewer propagating core modes than the gain regions; and
   (e) the transition regions are conformed to couple at least some radiation out of propagating non-signal core modes of the gain regions, and into the cladding of the intermediate region; and
   (f) the core-formed signal radiation path is spectrally transparent.

10. The optical amplifier of claim 9, wherein the length of the intermediate region is chosen to minimize core-cladding-core coupling.

11. The optical amplifier of claim 9, wherein the intermediate region cladding has irregularities introduced along its length.

12. The optical amplifier of claim 9, wherein the gain regions comprise segments of multimode fiber, and the intermediate region comprises a segment of single-mode fiber.

13. The optical amplifier of claim 9, wherein the intermediate region comprises the waist of a tapered fiber segment.

14. The optical amplifier of claim 9, wherein at least an outer cladding zone in the intermediate region has a refractive index that is reduced relative to the cladding in the gain regions by an amount selected to at least partially confine pump radiation propagating in the intermediate zone.

15. The optical amplifier of claim 9, wherein the gain regions, the transition regions, and the intermediate region are implemented in a planar waveguide geometry, and the core of the intermediate region comprises the waist of a tapered core structure.

16. The optical amplifier of claim 9, further comprising a pump waveguide that contacts the path collectively formed by the claddings at least at one point, wherein said pump waveguide is conformed to guide pump radiation and to couple pump radiation into said collectively formed path.

17. An optical amplifier comprising at least two gain regions, an intermediate region situated between the gain regions, and a transition region situated between the intermediate region and each gain region, wherein:
   (a) the gain regions, the transition regions, and the intermediate region have claddings that collectively form a path for pump radiation propagating from at least one of the gain regions to the other gain region;
   (b) the gain regions, the transition regions, and the intermediate region have cores that collectively form a path for signal radiation propagating from at least one of the gain regions to the other gain region;
   (c) the gain region cores support a plurality of propagating optical modes at least at some wavelengths present during operation of the amplifier, said propagating core modes including at least one signal mode and at least one non-signal mode;

(d) the intermediate region supports fewer propagating core modes than the gain regions; and
(e) the transition regions are conformed to couple at least some radiation out of propagating non-signal core modes of the gain regions, and into the cladding of the intermediate region;
(f) the cladding-formed pump radiation path is optically continuous; and
(g) the core-formed signal radiation path is spectrally transparent.

18. The optical amplifier of claim 17, wherein the length of the intermediate region is chosen to minimize core-cladding-core coupling.

19. The optical amplifier of claim 17, wherein the intermediate region cladding has irregularities introduced along its length.

20. The optical amplifier of claim 17, wherein the gain regions comprise segments of multimode fiber, and the intermediate region comprises a segment of single-mode fiber.

21. The optical amplifier of claim 17, wherein the intermediate region comprises the waist of a tapered fiber segment.

22. The optical amplifier of claim 17, wherein at least an outer cladding zone in the intermediate region has a refractive index that is reduced relative to the cladding in the gain regions by an amount selected to at least partially confine pump radiation propagating in the intermediate zone.

23. The optical amplifier of claim 17, wherein the gain regions, the transition regions, and the intermediate region are implemented in a planar waveguide geometry, and the core of the intermediate region comprises the waist of a tapered core structure.

24. The optical amplifier of claim 17, further comprising a pump waveguide that contacts the path collectively formed by the claddings at least at one point, wherein said pump waveguide is conformed to guide pump radiation and to couple pump radiation into said collectively formed path.

* * * * *